March 5, 1957 P. F. MOLEMAN ET AL 2,784,315

TRANSISTOR PULSE OSCILLATOR

Filed Oct. 11, 1954

INVENTORS
PIETER FREERK MOLEMAN
JACOBUS PETRUS BEIJERSBERGEN
BY Fred M. Vogel
AGENT

United States Patent Office 2,784,315

Patented Mar. 5, 1957

2,784,315

TRANSISTOR PULSE OSCILLATOR

Pieter Freerk Moleman and Jacobus Petrus Beyersbergen, Eindhoven, Netherlands, assignors to Hartford National Bank and Trust Company, Hartford, Conn., as trustee

Application October 11, 1954, Serial No. 461,636

Claims priority, application Netherlands October 10, 1953

4 Claims. (Cl. 250—36)

The invention relates to a circuit arrangement for producing electrical pulses with the aid of a generating transistor. It has for its object to provide a circuit arrangement in which the pulse repetition frequency and the pulse width depend only to a small extent upon the transistor properties. In accordance with the present invention, the circuit connecting the emitter electrode to the base electrode includes a first resonant circuit, the resonance frequency of which differs materially from that of a second resonant circuit included in the circuit between the collector electrode and the base electrode, one of these resonant circuits determining substantially only the pulse repetition frequency, the other determining substantially only the pulse width.

It should be noted that for producing sine oscillations it is known to include resonant circuits having substantially equal resonance frequencies in the latter case in one or in both of the said circuits, whereas for producing pulsatory oscillations circuit arrangements have hitherto been designed in which the transistor electrodes are interconnected via aperiodic, for example R. C.-networks, in which case, however, the transistor parameters play an important or even a predominant part.

The invention will now be described with reference to the accompanying drawing, in which.

Figure 1:
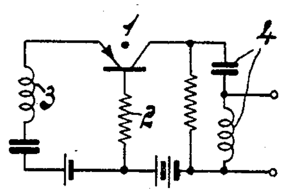
Fig. 1 is a schematic diagram of an embodiment of the present invention.

The circuit arrangement shown in Fig. 1 comprises a transistor 1 of the current-amplifying type, for example a point-contact transistor, in which consequently the ratio between the collector current variation and the associated emitter current variation exceeds 1. The transistor 1 is caused to generate in known manner, since the base circuit includes a resistor 2 of comparatively high resistance value and the emitter circuit includes a series resonant circuit 3, the resonance frequency of which is approximately equal to the repetition frequency of the pulses to be produced.

Figure 3:
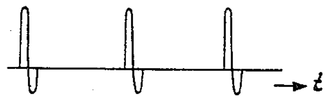
Fig. 3 is a curve of the oscillation produced plotted as a function of time $t$.

Since, in accordance with the invention, the collector circuit includes a second resonant circuit 4, the resonance frequency of which exceeds materially that of the circuit 3, i. e. the former being a few times higher than the latter, pulsatory oscillations are produced with correct choice of the damping of the circuits 3 and 4. These oscillations are indicated in Fig. 3 as a function of time $t$ and have a pulse repetition frequency determined substantially only by the resonance frequency of the circuit 3, the pulse width being determined by the resonance frequency of circuit 4. The circuit 4 has a lower circuit quality than the circuit 3.

This phenomenon may be explained by the fact that the circuit 4, which also exerts an undamping effect on the arrangement, causes the circuit arrangement to generate, only a single period of an oscillation (vide Fig. 3) with a frequency approximately equal to the resonance frequency of the circuit 4 being produced, this oscillation exciting the circuit 3, which suppresses this oscillation immediately after this period. If desired, for example with the aid of a rectifier, if necessary in series with a threshold value (not shown) the part of this oscillation which may be undesirable may be suppressed.

The circuit 3 having the lower resonance frequency is preferably included in the emitter circuit and the circuit 4 having the higher resonance frequency is included in the collector circuit, since due to the internal impedances of the transistor 1 apparently in series with the circuit 3 an inductance occurs. The effect of this inductance on this circuit arrangement is considerably smaller than in the case of the interchanging of circuits 3 and 4. The inductance of the circuit 3 should then be preferably chosen to be at a maximum.

Figure 2:
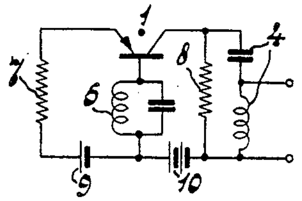
Fig. 2 is a schematic diagram of another embodiment of the present invention.

Fig. 2 is a modification of the circuit arrangement of Fig. 1, in which the series resonant circuit 3 in the emitter circuit of the transistor 1 is replaced by a parallel resonant circuit 6 included in the base circuit; otherwise the circuit arrangements of Figs. 1 and 2 operate in a substantially similar manner.

In a practical embodiment the circuit elements of Fig. 2 had the following values: circuit 4=0.2 millihenry and 2200 micromicrofarads, circuit quality=5, resonance frequency=270 kilocycles per second, circuit 6=3 millihenries and 15,000 micromicrofarads, circuit quality=100, resonance frequency=28 kilocycles per second, resistor 7=1000 ohms, resistor 8=1500 ohms, supply source 9=2 volts, supply source 10=30 volts, pulse repetition frequency=27.8 kilocycles per second, pulse width=$2.1\times10^{-6}$ second.

While the invention has been described by means of specific examples and in specific embodiments, we do not wish to be limited thereto, for obvious modifications will occur to those skilled in the art without departing from the spirit and scope of the invention.

What is claimed is:

1. A circuit arrangement for producing periodical and asymmetrical electrical pulses of a width substantially shorter than one half period of their repetition frequency, said circuit arrangement comprising a transistor having an emitter electrode, a collector electrode and a base electrode, a first resonant circuit connected between said emitter and base electrodes, and a second resonant circuit connected between said collector and base electrodes, said second resonant circuit having a resonant frequency substantially higher and a circuit quality lower than that of said first resonant circuit whereby said first resonant circuit determines substantially only the repetition frequency of said electrical pulses and said second resonant circuit determines substantially only the width of said pulses.

2. A circuit arrangement as claimed in claim 1, wherein said transistor is of current amplifying type and said second resonant circuit comprises a series resonant circuit.

3. A circuit arrangement as claimed in claim 2, wherein said first resonant circuit comprises a series resonant circuit and further comprising a resistor having a relatively high resistance value connected to said base electrode.

4. A circuit arrangement as claimed in claim 2, wherein said first resonant circuit comprises a parallel resonant circuit connected to said base electrode.

(References on following page)

References Cited in the file of this patent

UNITED STATES PATENTS 2,058,260 Reinartz ---------------- Oct. 20, 1936

FOREIGN PATENTS 678,317 Great Britain ------------ Sept. 3, 1952

OTHER REFERENCES

Article, "Transistor Oscillators with Crystal Control" by Rhita; page 55 of Radio Electronics for April 1952.

Article, "Duality as a Guide in Transistor Circuit Design" by Wallace et al., pages 128–164 of the Transistor by Bell Labs., published December 4, 1951.